(12) United States Patent
Mizutani

(10) Patent No.: US 11,910,075 B2
(45) Date of Patent: Feb. 20, 2024

(54) IMAGING APPARATUS

(71) Applicant: CANON KABUSHIKI KAISHA, Tokyo (JP)

(72) Inventor: Shoma Mizutani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/525,242

(22) Filed: Nov. 12, 2021

(65) Prior Publication Data

US 2023/0156306 A1  May 18, 2023

(51) Int. Cl.
*H04N 23/51* (2023.01)
*G03B 17/56* (2021.01)
*G03B 17/02* (2021.01)
*H04N 23/63* (2023.01)

(52) U.S. Cl.
CPC ............. *H04N 23/51* (2023.01); *G03B 17/02* (2013.01); *G03B 17/561* (2013.01); *G03B 17/563* (2013.01); *H04N 23/632* (2023.01)

(58) Field of Classification Search
CPC ........... H04N 5/2252; H04N 5/232935; H04N 23/51; H04N 23/632; G03B 17/02; G03B 17/561; G03B 17/563
See application file for complete search history.

(56) References Cited

U.S. PATENT DOCUMENTS

| | | | |
|---|---|---|---|
| 9,407,984 B2 * | 8/2016 | Tong | H04R 1/2811 |
| 9,483,083 B1 * | 11/2016 | Zaloom | G06F 3/0208 |
| 9,917,937 B1 * | 3/2018 | Fathollahi | H04B 1/3888 |
| 10,326,487 B2 * | 6/2019 | Mody | A45C 11/00 |
| 2003/0013483 A1 * | 1/2003 | Ausems | H04M 1/72469 |
| | | | 455/566 |
| 2010/0304795 A1 * | 12/2010 | Laine | F16M 11/10 |
| | | | 361/679.01 |
| 2011/0102752 A1 * | 5/2011 | Chen | F16M 13/00 |
| | | | 361/679.01 |
| 2015/0156301 A1 * | 6/2015 | Crawford | H04M 1/72409 |
| | | | 455/420 |
| 2015/0362825 A1 * | 12/2015 | Kim | G03B 17/04 |
| | | | 396/428 |
| 2016/0360116 A1 * | 12/2016 | Penha | G06F 3/04817 |
| 2019/0260863 A1 * | 8/2019 | Kinouchi | H04N 23/57 |
| 2022/0206527 A1 * | 6/2022 | Perelli | G06F 1/1626 |

FOREIGN PATENT DOCUMENTS

JP  2004-170673 A  6/2004

* cited by examiner

*Primary Examiner* — Timothy J Henn
(74) *Attorney, Agent, or Firm* — Cowan, Liebowitz & Latman, P.C.

(57) ABSTRACT

An imaging apparatus includes: an imaging unit configured to capture an image of a subject; a main body having a grip region provided on a first surface on which the imaging unit is disposed so that a user is able to grip the grip region; and a stand portion provided at a first end portion of the main body and disposed with the grip region separated from the imaging unit. The grip region faces a long side of an imaging surface of the imaging unit. The stand portion is located on a first axis orthogonal to an optical axis of the imaging unit and is rotatable within a plane along the optical axis and the first axis.

16 Claims, 13 Drawing Sheets

IMAGING APPARATUS

BACKGROUND OF THE INVENTION

Field of the Invention

The present invention relates to an imaging apparatus.

Description of the Related Art

Generally, an imaging apparatus such as a digital camera has a grip portion for a user to grip a main body of the imaging apparatus. In particular, many models having a grip portion on the right side of an imaging lens are selling on the market assuming that a camera is held by a right hand and a still image is captured while looking through a viewfinder.

On the other hand, the number of users who capture moving images even with cameras that have been considered for still images is increasing with the improvement of the moving image capturing function of digital cameras in recent years. When capturing moving images, it is common to display a live view on a liquid crystal screen instead of the viewfinder in order to perform flexible camera work.

Therefore, an external grip that can be attached to a tripod mount of the digital camera is manufactured as an option. When this kind of external grip is attached to the camera, a user can hold the camera by gripping a portion right below the optical axis of the lens. Accordingly, it is possible to capture a moving image with less camera shake and a high degree of freedom. Further, in this kind of external grip, some grip portions can be used as tripods by unfolding the grip portions in order to support a wide variety of applications such as stationary shooting.

For example, Japanese Patent Laid-Open No. 2004-170673 proposes an external adapter in which a grip is also used as a stand in order to achieve both grip and miniaturization purposes. If the external adapter of Japanese Patent Laid-Open No. 2004-170673 is attached to a camera, grip portions are added to both sides of a camera body and also serve as support portions by rotating the grip portions.

The above mechanism is suitable for users who want to capture images in a free style while reducing the amount of belongings such as tripods as much as possible. However, when the external grip is applied, the entire apparatus becomes large due to the attachment portion with the imaging apparatus, and the portability and design are deteriorated.

SUMMARY OF THE INVENTION

An imaging apparatus which is an example of the present invention includes: an imaging unit configured to capture an image of a subject; a main body having a grip region provided on a first surface on which the imaging unit is disposed so that a user is able to grip the grip region; and a stand portion provided at a first end portion of the main body and disposed with the grip region separated from the imaging unit. The grip region faces a long side of an imaging surface of the imaging unit. The stand portion is located on a first axis orthogonal to an optical axis of the imaging unit and is rotatable within a plane along the optical axis and the first axis.

Further features of the present invention will become apparent from the following description of exemplary embodiments with reference to the attached drawings.

DESCRIPTION OF THE EMBODIMENTS

Figure 1:
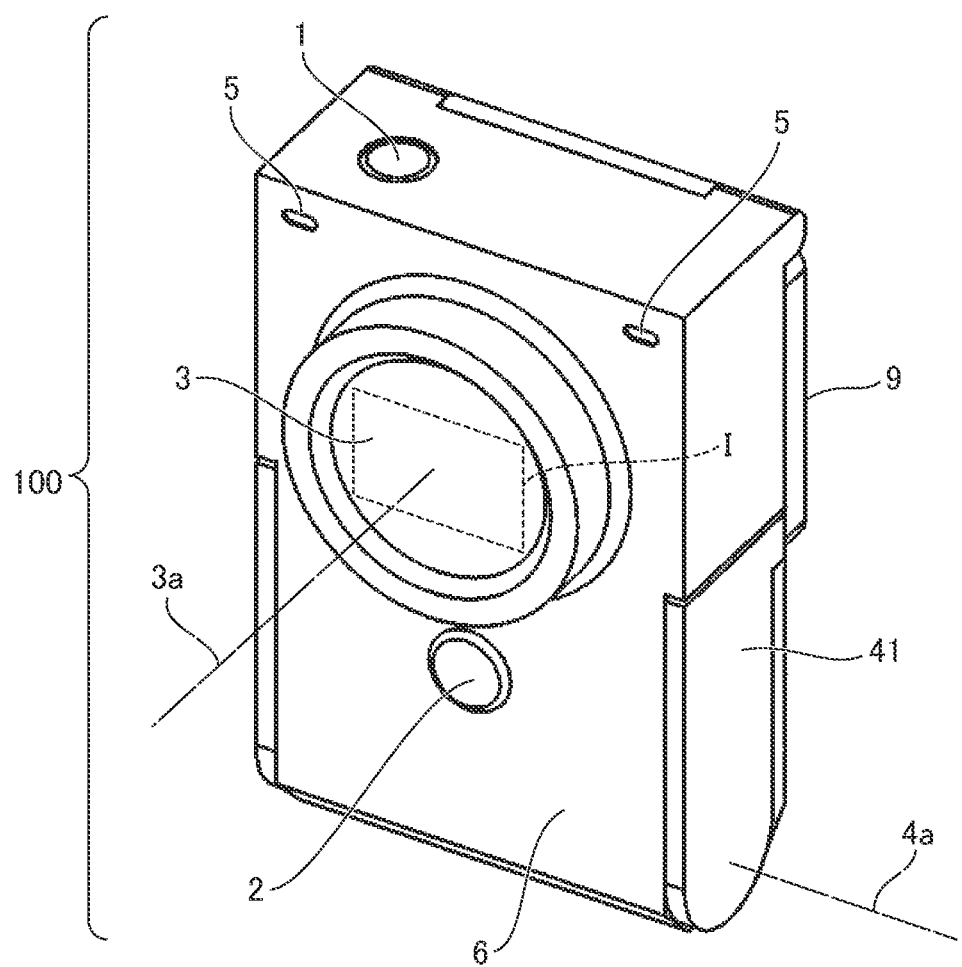
FIG. 1 is a perspective view of an appearance of an imaging apparatus according to this embodiment when viewed from the front side.

Hereinafter, an example of an embodiment of the present invention will be described with reference to the drawings. In each drawing, the same reference numbers are given to the same elements and duplicate descriptions are omitted. Additionally, the shapes, dimensions, and the like of each element shown in the drawings are schematically shown, and do not indicate the actual shapes, dimensions, and the like.

Further, in the drawings, the XYZ coordinate system is shown as a three-dimensional Cartesian coordinate system as appropriate. In the XYZ coordinate system, the Z direction is set as the direction parallel to an optical axis $3a$ to be described later. The X direction is a direction orthogonal to the Z direction and corresponds to the substantially left and right direction of FIG. 1. The Y direction is a direction orthogonal to both the X direction and the Z direction and corresponds to the up and down direction of FIG. 1.

Further, the embodiment to be described below is an example for realizing the present invention and should be appropriately modified or changed depending on the configuration of the apparatus to which the present invention is applied and various conditions. Therefore, the present invention is not limited to the configuration of the following embodiments and some of the embodiments may be combined as appropriate.

Figure 2:
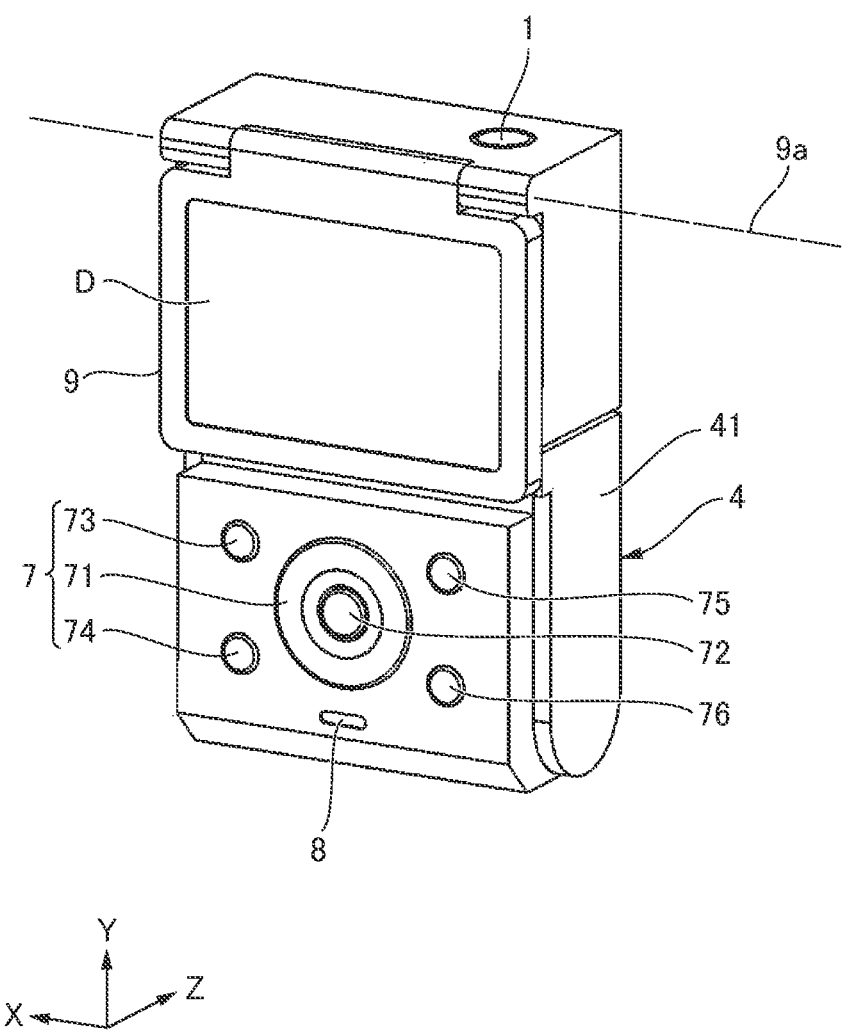
FIG. 2 is a perspective view of an appearance of the imaging apparatus according to this embodiment when viewed from the rear side.

First, the configuration and function of the imaging apparatus of this embodiment will be described with reference to FIGS. 1 and 2. FIG. 1 is a perspective view of an appearance of the imaging apparatus of this embodiment when viewed from the front side. FIG. 2 is a perspective view of an appearance of the imaging apparatus of this embodiment when viewed from the rear side.

The imaging apparatus of this embodiment is a so-called compact digital camera (hereinafter, simply referred to as a camera). As shown in FIG. 1, a camera body 100 includes an imaging lens 3 provided on the front side. An imaging sensor is embedded in the camera body 100. Additionally, the front surface of the camera body 100 is an example of a first surface.

The imaging sensor is an example of an imaging unit and can capture a still image or a moving image by capturing an image of a subject by a light flux passing through the imaging lens 3. In FIG. 1, a rectangular imaging surface I of the imaging sensor is shown by a dashed line. The long side of the imaging surface I extends along the X direction and the short side of the imaging surface I extends along the Y direction.

A power switch 1 is disposed on a side surface (an upper surface of FIG. 1) on one end side of the camera body 100. When the power switch 1 is pressed down in a power off state, the power of the camera body 100 is turned on and the state shifts to the standby state. Then, when electric power starts to be supplied from an embedded battery unit (not shown) to each unit, the detection functions of various operation members of the camera body 100 are activated.

Further, a grip surface 6 for a user to grip the camera body 100 is provided on the front surface of the camera body 100. The grip surface 6 is an example of a grip region and is located on the other end side (the lower side in FIG. 1) in relation to the imaging lens 3 in FIG. 1 to face the long side of the imaging surface I. A shutter button 2 for accepting an image acquiring instruction such as a still image capturing instruction or a moving image recording start instruction, a recording stop instruction, and the like is disposed on the grip surface 6. The shutter button 2 is an example of a first operation member, is located at the center of the grip region in the X direction, and is located at a position overlapping a first axis (vertical axis) orthogonal to the optical axis 3a of the imaging lens 3 and extending in the Y direction.

The camera body 100 is provided with a pair of microphones 5 and can record a stereo sound. For example, the microphones 5 are arranged in a region around the imaging lens 3 with a gap therebetween on the front surface of the camera body 100. Further, in the camera body 100, a rotatable stand portion 4 is attached to the other end side (the lower end of FIG. 1) with the grip surface 6 separated from the imaging lens 3. The stand portion 4 will be described later. The other end of the camera body 100 is an example of a first end portion of the main body.

Further, the configuration of the rear surface portion of the camera body 100 will be described with reference to FIG. 2. An operation button group 7 and a speaker 8 are arranged on the opposite side of the grip surface 6 in the camera body 100. Further, a display unit 9 is disposed at a position opposite to the imaging lens 3 in the rear surface portion of the camera body 100. Additionally, the rear surface of the camera body 100 is an example of a second surface.

The operation button group 7 includes a dial 71, an enter button 72, a menu button 73, a play button 74, a custom button 75, and a delete button 76. The dial 71 and the enter button 72 are arranged at the center of the operation button group 7. Further, the menu button 73, the play button 74, the custom button 75, and the delete button 76 are arranged around the dial 71.

The dial 71 is an example of a second operation member having a dial shape, is located at the center of the second surface in the X direction, and is located at a position overlapping the first axis orthogonal to the optical axis 3a of the imaging lens 3. The dial 71 can be rotated clockwise and counterclockwise, and accepts operations of changing various set values such as the shutter speed and the aperture value of the lens. The enter button 72 is a button disposed at the center of the dial 71 and accepts a decision operation of various items. Additionally, the enter button 72 may accept an image acquiring instruction such as a still image capturing instruction or a moving image recording start instruction. Further, the menu button 73 accepts an operation of displaying the menu of the setting screen on the display unit 9.

The play button 74 accepts an operation of playing back a recorded still image or moving image on the display unit 9. The custom button 75 is a button to which the user can assign an arbitrary operation. For example, various functions such as the function of the shutter button 2, the autofocus/manual focus switching function of the imaging lens 3, and the upside down display function of the display unit 9 can be assigned to the custom button 75. The delete button 76 accepts an operation of deleting still image or video data. Further, the speaker 8 outputs the sound of the captured moving image, the operation sound, and the like.

The display unit 9 is composed of, for example, a liquid crystal display on which a touch panel is overlapped, and can display a live view image during imaging, a preview image of an imaging result, a menu screen, and the like. Further, the display unit 9 can accept an operation of focusing on a subject tapped on the screen at the time of imaging and an operation of adjusting imaging parameters (ISO sensitivity, shutter speed, aperture value, and the like) by tapping an icon on the screen in terms of a touch panel. The display unit 9 can also accept operations of selecting and deciding each item on the menu screen by using the touch panel.

Figure 3:
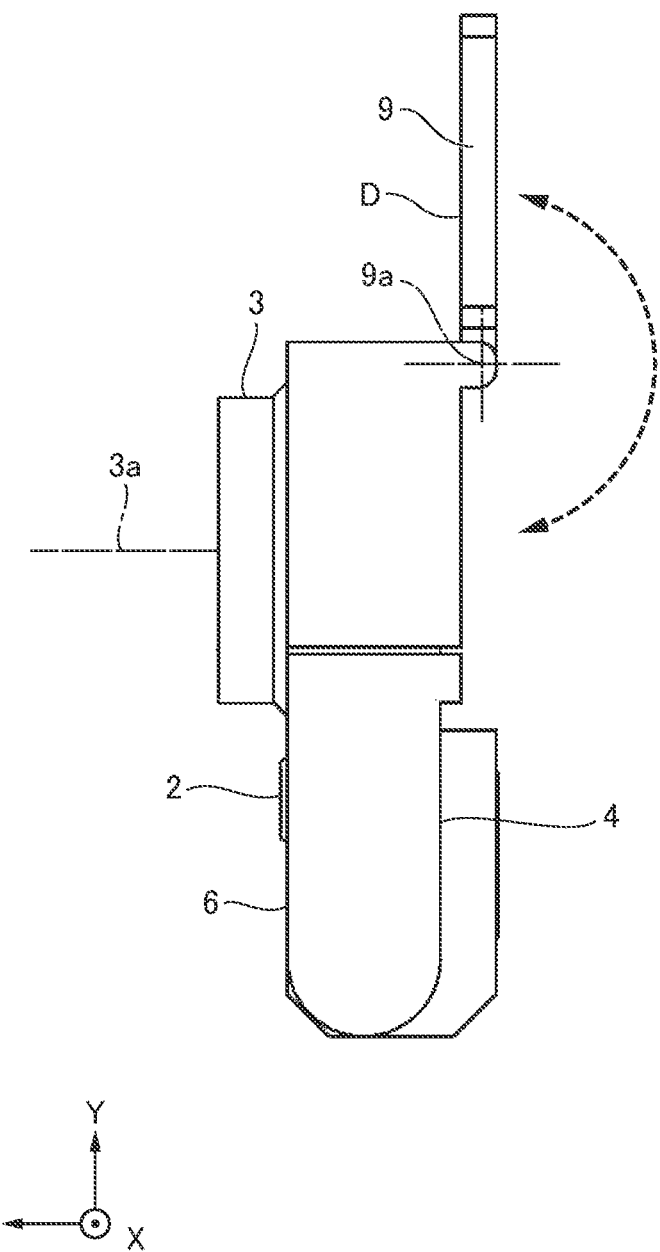
FIG. 3 is a view showing a rotation state of a display unit.

As shown in FIG. 3, the display unit 9 is provided at one end portion of the camera body 100 and is rotatable around a hinge shaft 9a extending in the X direction. That is, the display unit 9 is rotatable in the YZ plane around the hinge shaft 9a. Additionally, one end of the camera body 100 is an example of a second end portion of the main body.

Specifically, the display unit 9 can rotate from an accommodation state in which a display surface D follows the rear surface of the camera body 100 as shown in FIG. 2 to a state in which the display surface D faces the front side of the camera body 100 as shown in FIG. 3. The hinge shaft 9a of the display unit 9 is biased by a wave washer (not shown) to have an appropriate frictional force, and can support the weight of the display unit 9 at an arbitrary position within the rotation range.

Further, in the state in which the display surface D faces substantially the same direction as the imaging lens 3 (FIG. 3), control is performed to turn the display of the display unit 9 upside down and the camera body 100 and the image are aligned vertically. Accordingly, the user can capture an image while visually recognizing the composition on the display unit 9 when taking a picture of himself or herself. Additionally, the configuration of the display unit 9 is not limited to the liquid crystal display, and may be another device such as an organic EL display.

Figure 4:
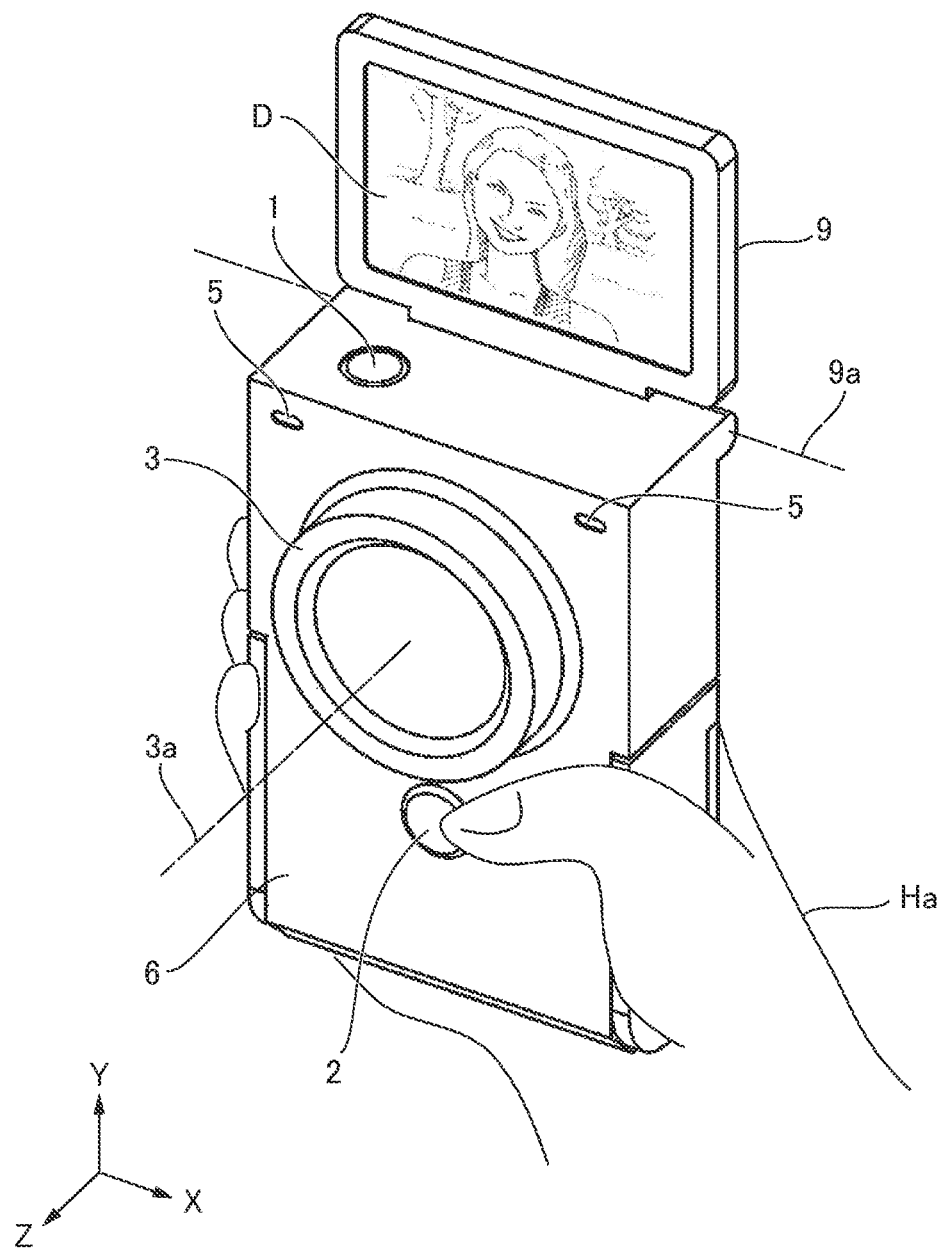
FIG. 4 is a view showing an example of a usage state of the imaging apparatus.

FIG. 4 shows a state in which the user holds the camera body 100 with the user's hand Ha and takes self-shooting of the user himself or herself as an example of the usage state of the imaging apparatus. In the example of FIG. 4, the camera body 100 is used with the display unit 9 facing substantially the same direction as the imaging lens 3. Here, the function of the operation button group 7 disposed on the rear surface portion of the camera body 100 is temporarily locked when the display unit 9 is rotated. Accordingly, there is no concern that the operation button group 7 reacts due to an erroneous operation even when the user firmly grips the rear surface portion of the camera body 100 with the palm when the display unit 9 is rotated. Further, since the shutter button 2 is located on the front surface in the state of FIG. 4, the user can comfortably capture a still image and record a moving image while checking the composition on the display unit 9.

Figure 5:
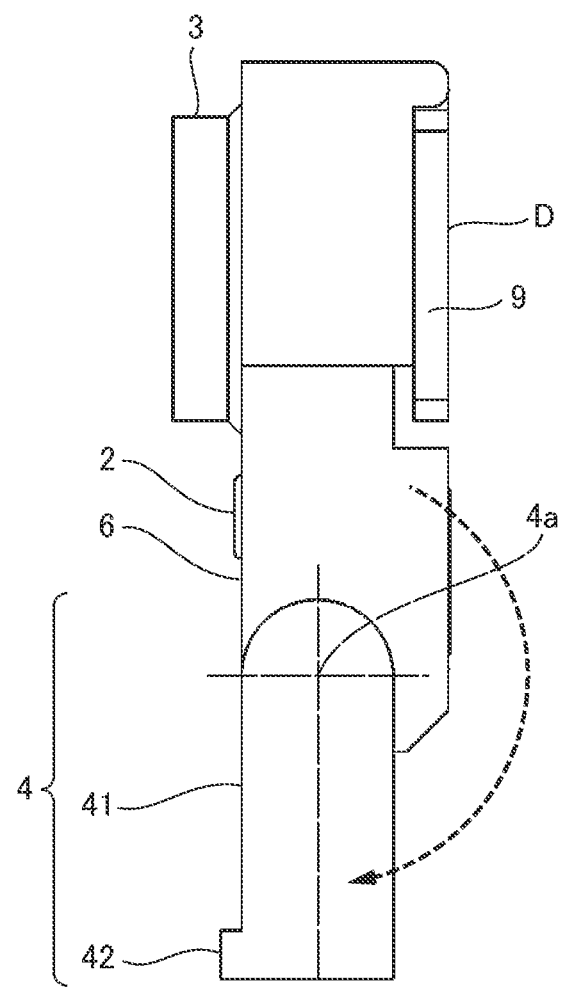
FIG. 5 is a side view showing a rotation range of a stand of the imaging apparatus.
Figure 6:
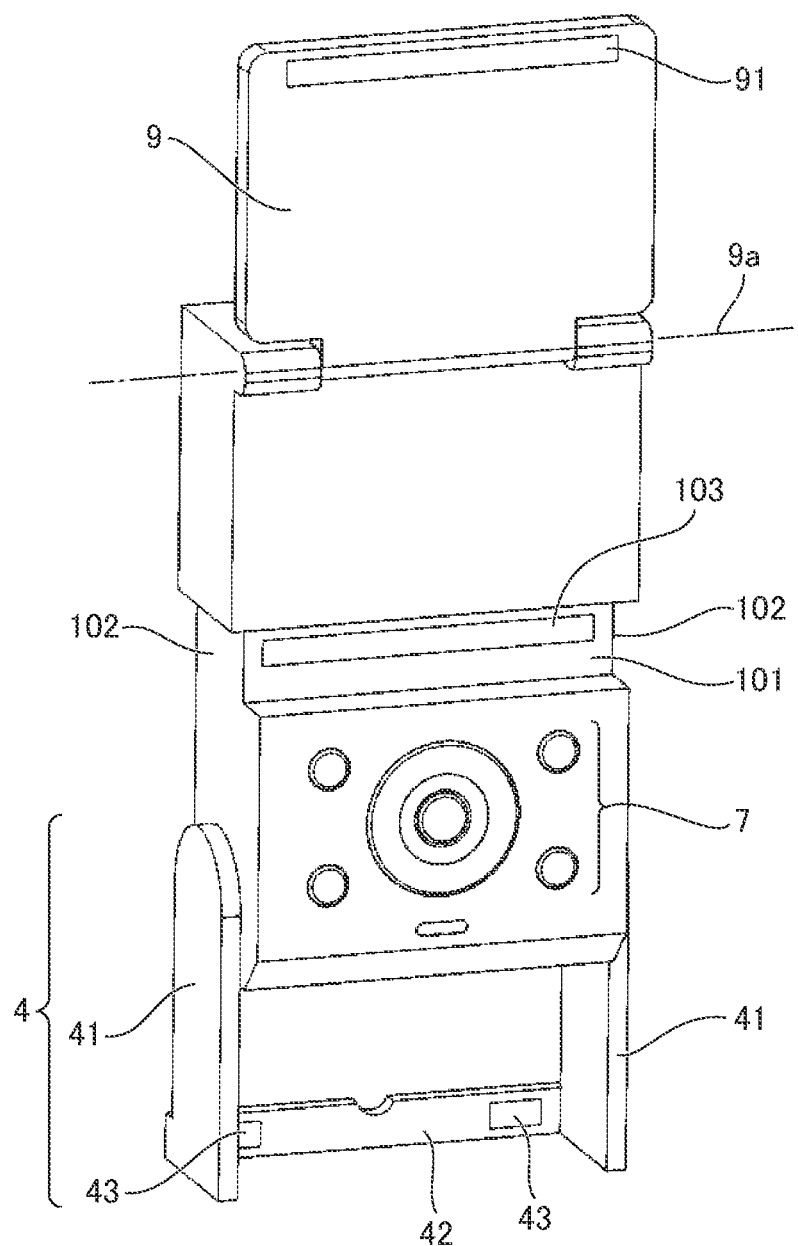
FIG. 6 is a perspective view of the imaging apparatus in an unfolded state of the stand when viewed from the rear side.

Next, the stand portion 4 attached to the camera body 100 will be described with reference to FIGS. 5 to 7B. FIG. 5 is a side view showing the rotation range of the stand portion 4 of the camera body 100. FIG. 6 is a perspective view in which the camera body 100 is viewed from the rear side. FIGS. 5 and 6 show an unfolded state in which the stand portion 4 is rotated from an accommodation position to a position of about 180°. Additionally, in FIG. 6, the display surface of the display unit 9 is rotated to face the front side of the camera body 100.

The stand portion 4 includes a pair of stand leg portions 41 and a stand connection portion 42. The pair of stand leg portions 41 are arranged in parallel along both side surfaces of the camera body 100 and can be rotated around the stand rotation shaft 4a extending in the X direction on the other end side of the camera body 100.

Further, the stand connection portion 42 extends in parallel to the stand rotation shaft 4a and connects the end portions of the pair of stand leg portions 41 separated from the stand rotation shaft 4a. That is, the stand portion 4 is located on the first axis orthogonal to the optical axis 3a and is rotatable within the YZ plane around the stand rotation shaft 4a.

Further, as shown in FIG. 6, the rear surface portion of the camera body 100 is provided with an accommodation groove 101 which extends in the X direction and receives the stand connection portion 42. The accommodation groove 101 is set to a shape capable of accommodating the stand connection portion 42 of the stand portion 4 and a first magnetic body 103 is disposed on the inner surface of the accommodation groove 101. Further, a second magnetic body 91 is disposed at the end portion separated from the hinge shaft 9a on the opposite side of the display surface of the display unit 9. Further, a magnet 43 is embedded in the stand connection portion 42 of the stand portion 4.

Figure 7B:
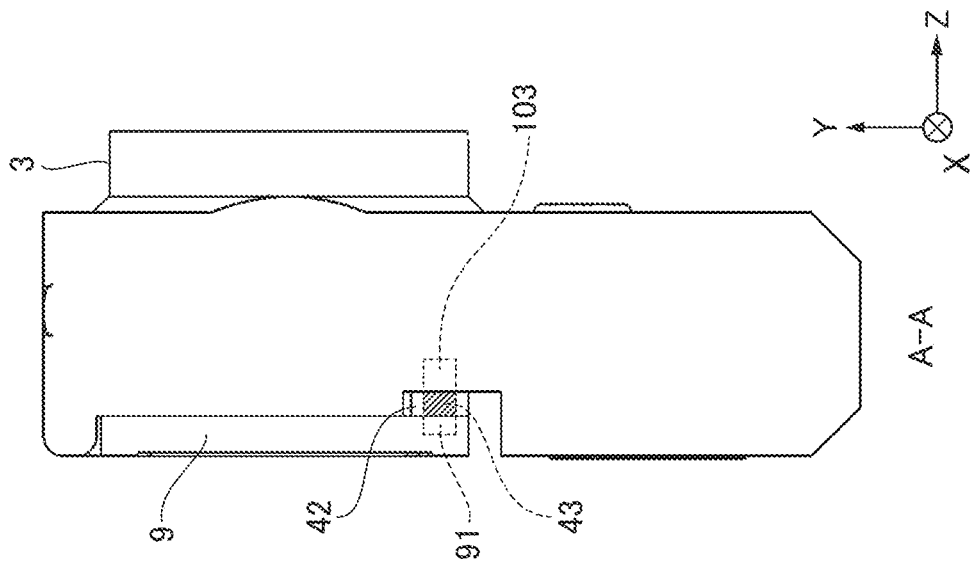
FIG. 7A is a rear view of the imaging apparatus when the display unit and the stand are accommodated and FIG. 7B is a cross-sectional view taken along a line A-A of FIG. 7A.

Additionally, the first magnetic body 103, the magnet 43, and the second magnetic body 91 are all arranged at the overlapping position in the accommodation state of the stand portion 4 and the display unit 9 (see FIG. 7B).

Further, step portions 102 are formed on both side surfaces of the camera body 100 to which the stand leg portions 41 are attached according to the rotation range of the stand leg portion 41. The step of the camera body 100 formed by the step portion 102 corresponds to the thickness dimension of the stand leg portion 41. Accordingly, when the stand portion 4 is rotated so that the stand portion 4 is accommodated in the camera body 100, the stand connection portion 42 is fitted to the accommodation groove 101 of the camera body 100. Further, in the accommodation state of the stand portion 4, the stand leg portion 41 overlapping the step portion 102 is substantially flush with the side surface of the camera body 100 and the compact size of the camera body 100 is maintained.

Figure 7A:
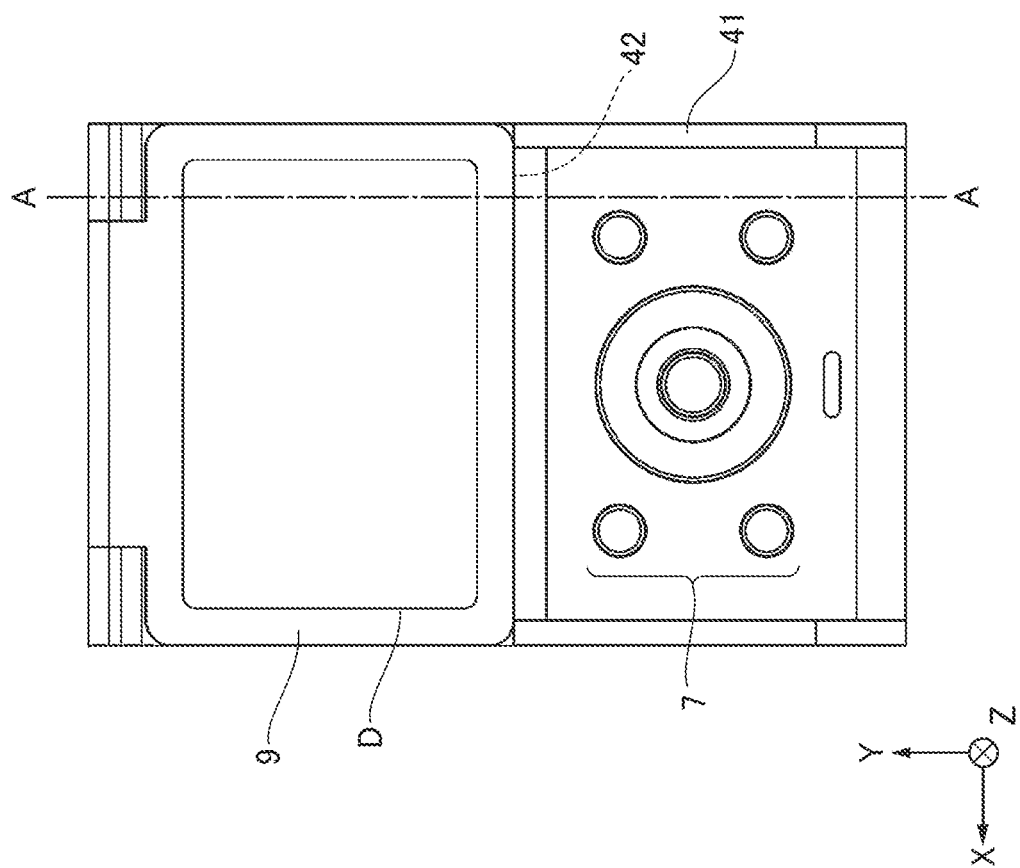

FIG. 7A is a rear view of the camera body 100 when the display unit 9 and the stand portion 4 are in the accommodation state and FIG. 7B is a cross-sectional view taken along a line A-A of FIG. 7A. Additionally, in FIG. 7B, the illustration of the internal structure of the camera body 100 is omitted for the sake of simplicity.

As shown in FIGS. 7A and 7B, in the stand portion 4 of the accommodation state, the stand connection portion 42 is fitted and accommodated in the accommodation groove 101 of the camera body 100 and the display unit 9 overlaps the stand connection portion 42 to cover the stand connection portion 42. Since the stand portion 4 of the accommodation state does not interfere with the operation button group 7 of the rear surface of the camera body 100, it is possible to suppress deterioration in operability of the camera body 100 when the stand portion 4 is used in the accommodation state. Further, since the stand connection portion 42 is fitted to the accommodation groove 101 in the accommodation state, it is possible to suppress the thickness of the camera body 100 in the direction along the optical axis of the imaging lens 3.

If the stand portion 4 and the display unit 9 are accommodated in the camera body 100 from the unfolded state shown in FIG. 6, the stand portion 4 is first rotated toward the camera body 100. As shown in FIG. 7B, when the stand portion 4 is in the accommodation state, the magnet 43 embedded in the stand connection portion 42 overlaps the first magnetic body 103 disposed in the accommodation groove 101 of the camera body 100. Accordingly, since the magnet 43 and the first magnetic body 103 are attracted to each other by a magnetic force, the stand portion 4 is pulled toward the camera body 100.

Next, the display unit 9 is rotated toward the camera body 100. As shown in FIG. 7B, when the display unit 9 is in the accommodation state, the second magnetic body 91 embedded in the display unit 9 also overlaps the magnet 43 of the stand connection portion 42. Since the magnet 43 and the second magnetic body 91 are attracted to each other by a magnetic force, the display unit 9 is also pulled toward the camera body 100.

With the above-described configuration, it is possible to maintain the stand portion 4 and the display unit 9 in the accommodation state by a constant force without providing a hooking mechanism in the camera body 100 by using the magnet 43 embedded in the stand connection portion 42. Additionally, in this embodiment, a configuration is shown in which two magnets 43 are arranged in the stand connection portion 42 and each of the first magnetic body 103 and the second magnetic body 91 is provided, but the number and arrangement of these elements can be changed as appropriate. Further, the housing or the stand itself may have a magnetic structure without arranging the magnet or the magnetic body.

Figure 8:
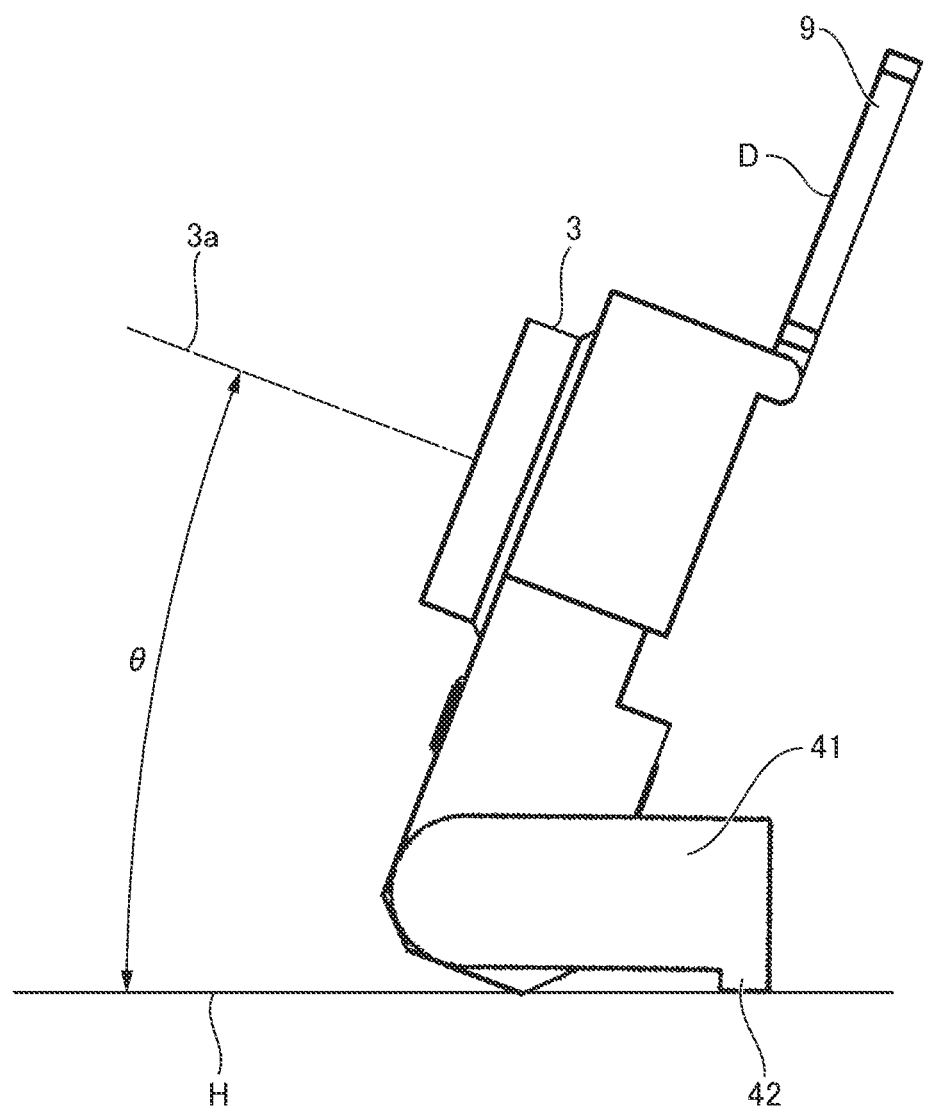
FIG. 8 is a view showing a state in which the imaging apparatus is installed obliquely upward using the stand.

Next, an example of using the stand portion 4 for stationary shooting will be described with reference to FIGS. 8 to 10. FIG. 8 shows a state in which the stand portion 4 of the camera body 100 is unfolded and the camera body 100 is installed on the horizontal plane H while the imaging lens 3 is directed obliquely upward.

In the example of FIG. 8, the display unit 9 is rotated in substantially the same direction as the imaging lens 3 in order to facilitate the user's composition confirmation. Further, the unfolded stand leg portion 41 is rotated toward the rear surface of the camera body 100 in order to adjust the angle of stationary shooting. Here, assuming that the angle formed by the optical axis 3a of the imaging lens 3 and the horizontal plane H is θ, the specifications of the length of the stand leg portion 41 and the position of the stand rotation shaft 4a are set so that the camera body 100 can stand by itself at least in the range of θ≤45. Accordingly, for example, the user can capture an image in which the camera body 100 is placed on the ground and looks up from a low angle while adjusting the viewing angle.

Further, if the installation surface of the camera body 100 is made of the magnetic body, it is possible to easily stabilize the camera body 100 by attracting the magnet 43 of the stand connection portion 42 to the installation surface even when the installation surface is inclined or unstable.

Figure 9:
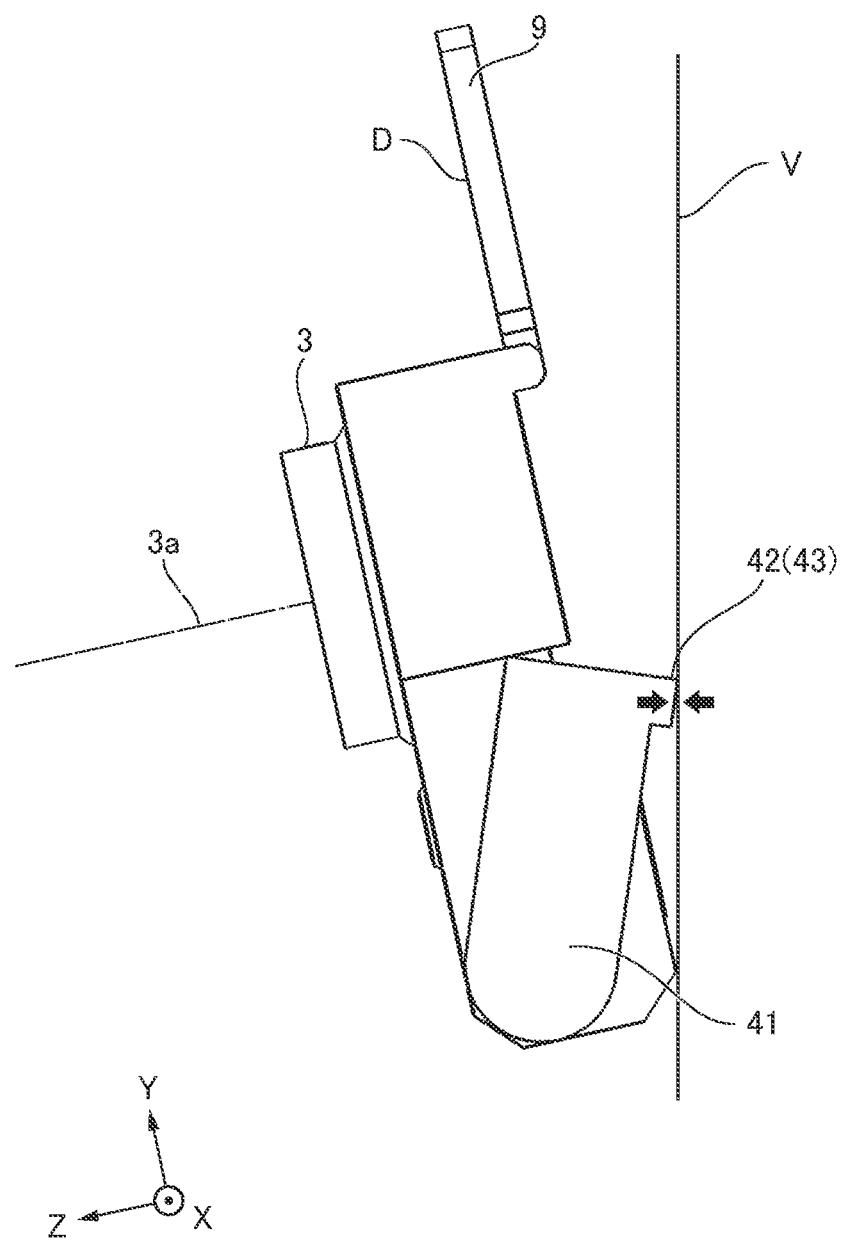
FIG. 9 is a view showing a state in which the imaging apparatus is installed on a vertical surface.

FIG. 9 shows a state in which the camera body 100 is installed with a vertical surface V made of the magnetic body as the installation surface. The installation surface (the vertical surface V) of FIG. 9 is, for example, a refrigerator door or an iron locker and the camera body 100 is fixed to the vertical surface V by attracting the magnet 43 to the vertical surface V. In the example of FIG. 9, the stand portion 4 is rotated so as to be slightly pulled out from the accommodation state so that a bird's-eye view image can be captured.

In this way, the camera body 100 can be attached to the vertical installation surface made of the magnetic body through the stand portion 4 at an arbitrary height. Further, the camera body 100 fixed to the vertical installation surface can adjust the direction of the imaging lens 3 with respect to the installation surface by the rotation mechanism of the stand portion 4. Thus, the camera body 100 can flexibly adjust the height and angle when capturing an image without using a tripod or the like. Additionally, if the installation surface is made of the magnetic body, it is possible to capture an image with the camera body 100 in a suspended state as if FIG. 8 is turned upside down.

Figure 10:
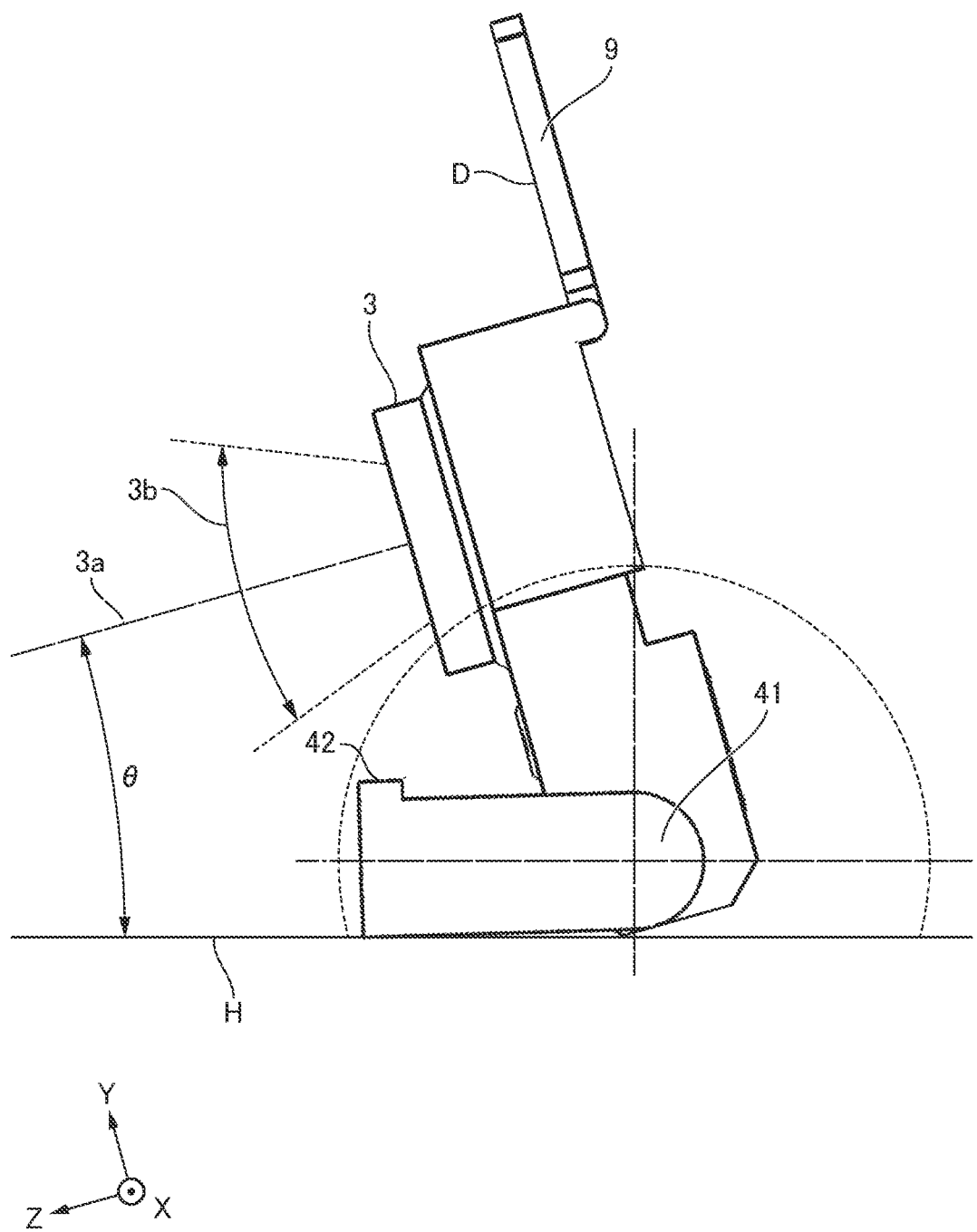
FIG. 10 is a view showing a state in which the imaging apparatus is installed obliquely downward using the stand.

FIG. 10 shows a state in which the stand portion 4 of the camera body 100 is unfolded and the camera body 100 is installed on the horizontal plane H while the imaging lens 3 faces obliquely downward. In the example of FIG. 10, the display unit 9 is rotated in substantially the same direction as the imaging lens 3 similarly to FIG. 8. Further, the stand portion 4 is rotated by 180° from the accommodation state and the stand leg portion 41 protrudes toward the front side of the camera body 100.

Here, the specifications of the length of the stand leg portion 41 and the shape of the stand connection portion 42 are set so that the stand portion 4 deviates from the viewing angle 3b of the imaging lens 3 even when the stand portion 4 is rotated toward the front side of the camera body 100. Here, the tilt direction of the camera body 100 in FIG. 8 is defined as the positive direction and the angle formed by the optical axis 3a of the imaging lens 3 and the horizontal plane H is defined as θ. At this time, the specifications of the length of the stand leg portion 41 and the position of the stand rotation shaft 4a are set so that the camera body 100 can stand by itself at least in the range of −45°≤θ. Accordingly, for example, the user can capture an image from an angle such that the camera body 100 is placed on a high table or a shelf without using a tripod and the camera body 100 is viewed from above while adjusting the viewing angle.

Figure 11:
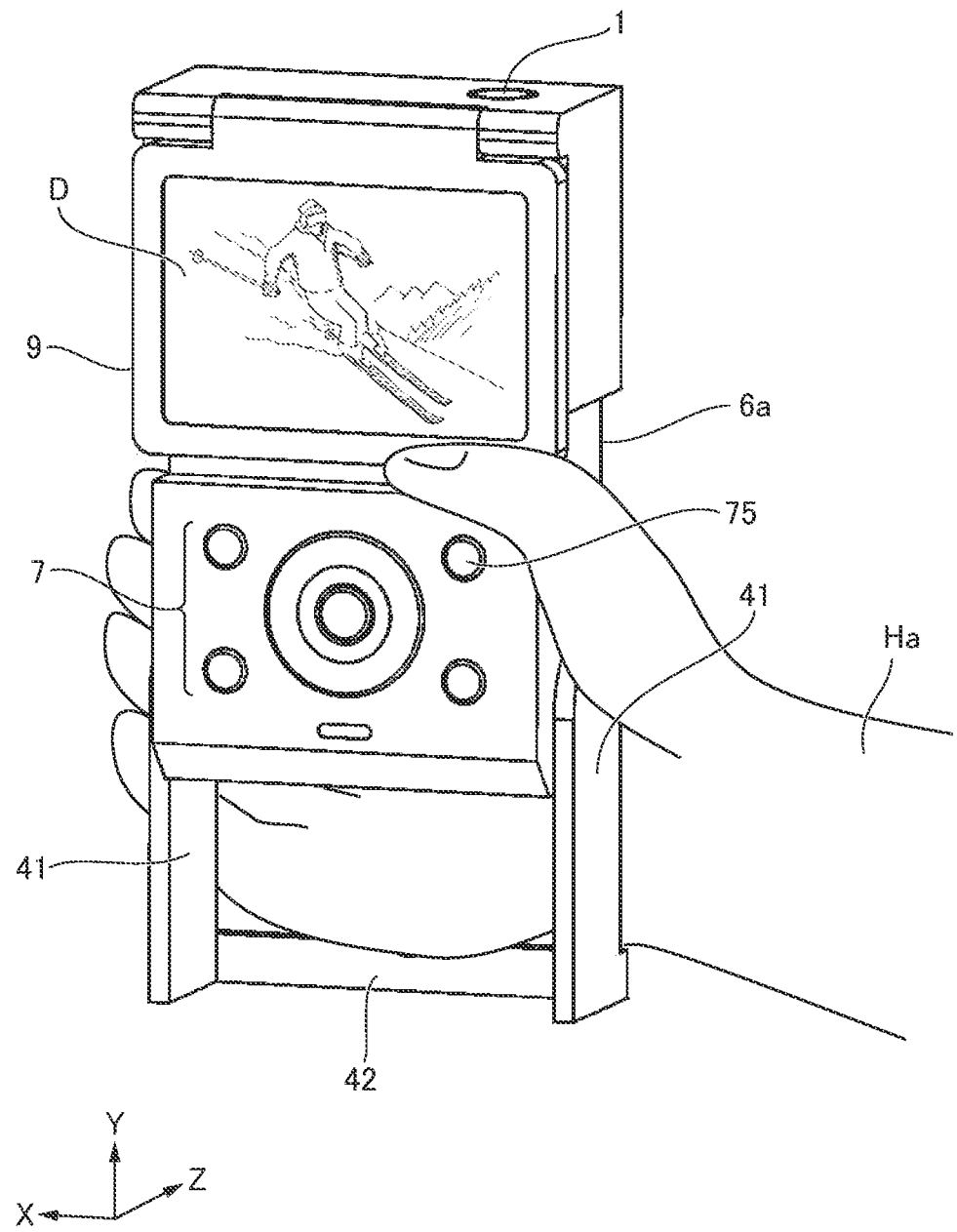
FIG. 11 is a view showing an example in which an image is captured while the imaging apparatus is held by a hand in the unfolded state of the stand.

FIG. 11 shows an example in which an image is captured by holding the camera body 100 with a hand in the unfolded state of the stand portion 4. In the example of FIG. 11, it is assumed that the user captures an image of a subject in the direction opposite to the user while holding the camera body 100.

The aspect of FIG. 11 is an aspect corresponding to FIG. 5. In this aspect, after the display unit 9 is temporarily rotated from the aspect of FIG. 2, the stand portion 4 is rotated by about 180° from the accommodation state to be unfolded and the display unit 9 is returned to the accommodation state again. In the above-described aspect, as shown in FIG. 5, the stand leg portion 41 rotated from the accommodation state is substantially flush with the grip surface 6 provided on the front surface of the camera body 100. Accordingly, the stand portion 4 functions as a grip portion extending from the grip surface 6 and the user can more stably grip the camera body 100 by the grip surface 6 extended by the stand portion 4.

Further, the pair of stand leg portions 41 provided on both side surfaces of the camera body 100 are reinforced such that the end portion separated from the stand rotation shaft 4a is connected to the stand connection portion 42. Therefore, the stand portion 4 has a structure that does not easily bend with respect to the gripping force of the user. Further, as shown in FIG. 5, in a state in which the stand portion 4 is rotated by about 180° from the accommodation state, the stand connection portion 42 protrudes from the stand leg portion 41 toward the front side of the camera body 100. Accordingly, when the user grips the camera body 100, the side surface portion of the palm is hung on the stand connection portion 42, so that the camera body 100 is less likely to slip off.

Figure 12:
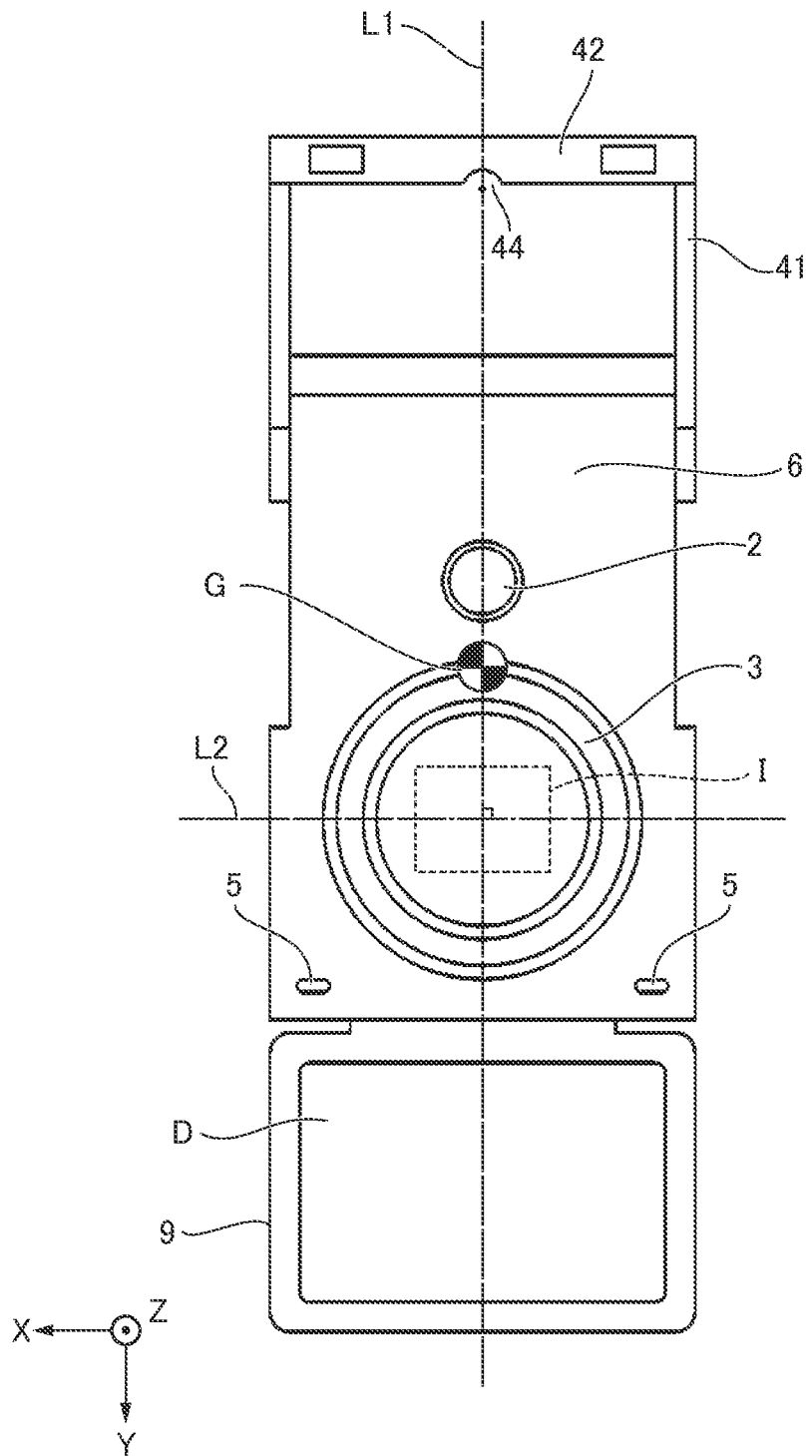
FIG. 12 is a front view showing a case in which the imaging apparatus is used in a suspended state.
Figure 13:
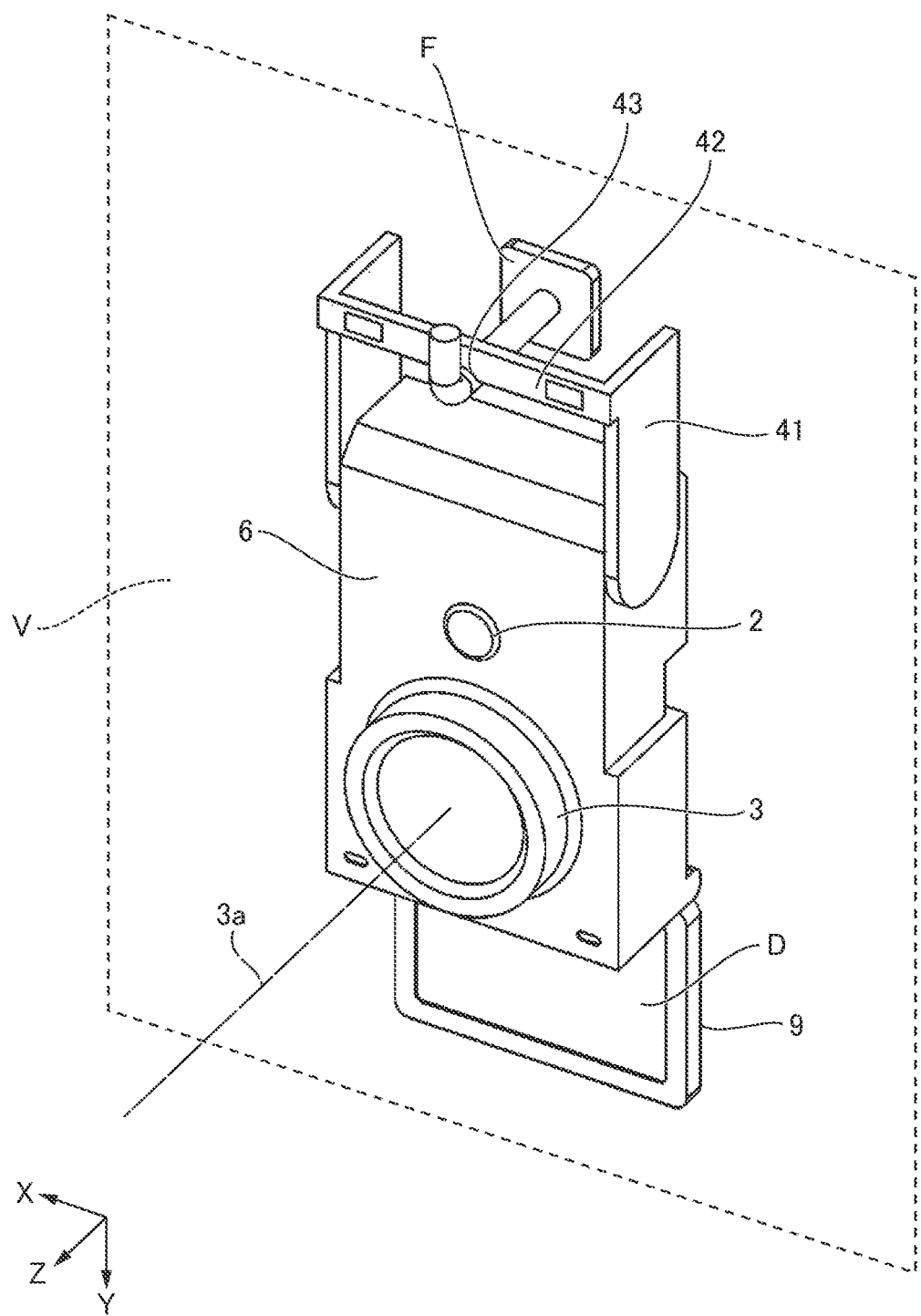
FIG. 13 is a view showing a state in which the stand of the imaging apparatus is hung on a hook to be suspended.

Next, a usage example in which the camera body 100 is suspended by using the stand portion 4 will be described with reference to FIGS. 12 and 13. FIG. 12 is a front view when the camera body 100 is used in a suspended state. FIG. 13 is a view showing a state in which the stand portion 4 of the camera body 100 is hung and suspended on a hook F provided on the vertical surface V.

In FIGS. 12 and 13, each of the stand portion 4 and the display unit 9 is rotated by about 180° to be unfolded, the stand portion 4 is located on the upper side, and the display unit 9 is located on the lower side. In the above usage state, the user can set the captured image to be recorded upside down from the setting menu. Further, the posture of the camera body 100 may be automatically detected and the top and bottom of the image to be captured may be set according to the above posture by incorporating an acceleration sensor or the like in the camera body 100.

Further, a semi-circular recess 44 is formed in the vicinity of the center of the stand connection portion 42. As shown in FIG. 12, a vertical axis L1 connecting the center of the recess 44 and the center G of gravity of the camera body 100 vertically intersects a line L2 parallel to the long side of the imaging surface I of the imaging sensor. That is, as shown in FIG. 13, when the recess 44 of the stand connection portion 42 is hung on the hook F, the posture of the camera body 100 is stabilized while the longitudinal direction of the image is parallel to the horizontal plane H due to the gravity.

In this way, the user can capture an image by hanging the camera body 100 on the familiar hook F. For example, even in a situation where a surface on which the camera body 100 can be placed or an installation surface made of the magnetic body does not exist in the peripheral area, the camera body 100 can be used for capturing an image if there is a hanging portion such as a hook F.

As described above, according to the configuration of the camera body 100 of this embodiment, it is possible to support a wide variety of applications such as handheld imaging, self-shooting, and stationary shooting by itself.

Although the preferred embodiment of the present invention has been described above, the present invention is not limited to the embodiment and various modifications and changes can be made in the scope of the spirit.

For example, in the above-described embodiment, a configuration example of a lens integrated camera in which the imaging lens 3 is fixed to the camera body 100 has been described, but the imaging apparatus of the present invention may be a digital camera in which the imaging lens 3 is replaceable through a mount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging apparatus comprising:
an imaging unit configured to capture an image of a subject;
a main body having a grip region provided on a first surface on which the imaging unit is disposed so that a user is able to grip the grip region; and
a stand portion provided at a first end portion of the main body and disposed with the grip region separated from the imaging unit,
wherein the grip region faces a long side of an imaging surface of the imaging unit, and
wherein the stand portion is located on a first axis orthogonal to an optical axis of the imaging unit and is rotatable within a plane along the optical axis and the first axis.

2. The imaging apparatus according to claim 1, wherein a first operation button that accepts an image acquiring instruction from a user is disposed at a position overlapping the first axis in the main body.

3. The imaging apparatus according to claim 1, wherein a second operation member having a dial shape is disposed at a position overlapping the first axis in the main body.

4. The imaging apparatus according to claim 1, wherein the stand portion includes a pair of leg portions which extend in parallel to the first axis outside the main body and a connection portion which connects the pair of leg portions.

5. The imaging apparatus according to claim 4, wherein the main body has an accommodation groove provided on a second surface opposite to the first surface to receive the connection portion, and
wherein the stand portion is able to be accommodated in the main body by rotation.

6. The imaging apparatus according to claim 5, wherein a magnet is disposed in the connection portion, and
wherein a magnetic body to which the magnet is attracted is disposed in the accommodation groove.

7. The imaging apparatus according to claim 6, wherein a display unit which is rotatable within a plane along the optical axis and the first axis is disposed at a second end portion opposite to the first end portion in the main body, and
wherein the display unit is rotatable from a state in which a display surface faces the first surface side to an accommodation state in which the display surface is visible from the second surface side.

8. The imaging apparatus according to claim 7, wherein the display unit covers the connection portion accommodated in the accommodation groove in the accommodation state.

9. An imaging apparatus comprising:
an imaging unit configured to capture an image of a subject;
a main body having a grip region provided on a first surface on which the imaging unit is disposed so that a user is able to grip the grip region; and
a stand portion provided at a first end portion of the main body and disposed with the grip region separated from the imaging unit,
wherein the grip region faces a long side of an imaging surface of the imaging unit, and
wherein the stand portion is located on a first axis orthogonal to an optical axis of the imaging unit and is rotatable within a plane along the optical axis and the first axis,
wherein a long side of the main body is parallel to the first axis,
wherein the first end portion is bottom side of the main body.

10. An imaging apparatus comprising:
an imaging lens;
an imaging sensor configured to capture an image of a subject that has passed through the imaging lens;
a stand that is rotatable;
an operation button configured to accept an instruction from a user; and
a display configured to display an image generated using the imaging sensor,
wherein in a case in which a direction parallel to a short side of an imaging surface of the imaging sensor is defined as a first direction, a direction parallel to a long side of the imaging surface of the imaging sensor is defined as a second direction, one side in the first direction is defined as an upper side, and the other side in the first direction is defined as a lower side, the operation button and the stand are located on a lower side of the imaging apparatus with respect to the imaging sensor, and the stand is rotatable around an axis in the second direction,
wherein a surface of the imaging apparatus on a subject side is defined as a front surface, the imaging lens is located on the front surface of the imaging apparatus, and the display is located on a rear surface of the imaging apparatus with respect to an accommodation state,
wherein when viewed from the optical axis direction of the imaging lens, the imaging lens is superimposed on the display in the accommodation state,
wherein a long side of the imaging apparatus is parallel to the first direction.

11. The imaging apparatus according to claim 10, wherein the display can rotate so that a display surface of the display faces a front side.

12. The imaging apparatus according to claim 11, wherein the operation button accepts at least one of an instruction to capture a still image and an instruction to record a moving image from a user.

13. The imaging apparatus according to claim 12, further comprising a pair of microphones capable of recording in stereo.

14. The imaging apparatus comprising:
an imaging sensor configured to capture an image of a subject that has passed through an imaging lens;
a stand that is rotatable;
an operation button configured to accept an instruction from a user; and
a display configured to display an image generated using the imaging sensor,
wherein in a case in which a direction parallel to a short side of an imaging surface of the imaging sensor is defined as a first direction, a direction parallel to a long side of the imaging surface of the imaging sensor is defined as a second direction, one side in the first direction is defined as an upper side, and the other side in the first direction is defined as a lower side, the operation button and the stand are located on a lower side of the imaging apparatus with respect to the imaging sensor, and the stand is rotatable around an axis in the second direction, wherein the stand has a pair of leg portions rotatable along a pair of side surfaces of the imaging apparatus, and a connection portion connecting the pair of leg portions, and wherein a surface of the imaging apparatus on a subject side is defined as a front surface, the imaging lens is located on the front surface of the imaging apparatus, and the connection portion of the stand is in contact on a rear surface of the imaging apparatus with respect to an accommodation state.

15. The imaging apparatus according to claim 14, further comprising a display configured to display an image generated using the imaging sensor, wherein a surface of the imaging apparatus on a subject side is defined as a front surface, the display is located on a rear surface of the imaging apparatus, wherein a connection portion of the stand in the accommodation state is covered by the display in the accommodation state.

16. The imaging apparatus according to claim 14, wherein the stand can be rotated by 180° or more from a first position where a connection portion of the stand is in contact with the rear surface of the imaging apparatus.

* * * * *